(12) United States Patent
Yang

(10) Patent No.: US 10,466,961 B2
(45) Date of Patent: Nov. 5, 2019

(54) METHOD FOR PROCESSING AUDIO SIGNAL AND RELATED PRODUCTS

(71) Applicant: Guangdong Oppo Mobile Telecommunications Corp., Ltd., Dongguan, Guangdong (CN)

(72) Inventor: Zongye Yang, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 16/238,168

(22) Filed: Jan. 2, 2019

(65) Prior Publication Data

US 2019/0303091 A1  Oct. 3, 2019

(30) Foreign Application Priority Data

Mar. 30, 2018  (CN) .......................... 2018 1 0289086

(51) Int. Cl.
*H04R 1/00* (2006.01)
*G06F 3/16* (2006.01)
(Continued)

(52) U.S. Cl.
CPC ........... *G06F 3/165* (2013.01); *H04R 1/1041* (2013.01); *H04R 3/08* (2013.01)

(58) Field of Classification Search
CPC ........ H04R 1/1041; H04R 5/033; H04R 5/04; H04R 2420/03; H04R 2460/01; H04R 2460/03; H04R 3/00; G06F 3/165
See application file for complete search history.

(56) References Cited

U.S. PATENT DOCUMENTS 9,648,410 B1  5/2017  Kratsas et al.
2013/0303144 A1  11/2013  Yehuday et al.
(Continued)

FOREIGN PATENT DOCUMENTS

CN  104410937 A  3/2015
CN  105872874 A  8/2016
(Continued)

OTHER PUBLICATIONS

Extended European search report issued in corresponding European application No. 19150070.1 dated Jun. 3, 2019.
(Continued)

*Primary Examiner* — Matthew A Eason
(74) *Attorney, Agent, or Firm* — Young Basile Hanlon & MacFarlane, P.C.

(57) ABSTRACT

A method for processing audio signal, an electronic device, and an earphone are provided. The method includes the following. An input operation of a user performed on an earphone is received, and an acoustic echo impulse response at a position of the user's ear canal where the earphone currently stays is determined according to an audio signal currently played by the earphone and a vibration signal generated by the input operation. A directive instruction corresponding to the input operation is identified at least according to the acoustic echo impulse response. An electronic device in communication with the earphone is controlled to execute a corresponding operation for a preset application in the electronic device according to the directive instruction.

11 Claims, 7 Drawing Sheets

(51) Int. Cl.
*H04R 1/10* (2006.01)
*H04R 3/08* (2006.01)

(56) References Cited

U.S. PATENT DOCUMENTS

2015/0023510 A1* 1/2015 Shimizu ................ H04R 29/00
                                                              381/58
2017/0332163 A1   11/2017 Yamkovoy

FOREIGN PATENT DOCUMENTS

| CN | 106210961 A | 12/2016 |
| KR | 20170064364 A | 6/2017 |
| WO | 2012087314 A1 | 6/2012 |

OTHER PUBLICATIONS

International search report issued in corresponding international application No. PCT/CN20191075475 dated May 29, 2019.

* cited by examiner

METHOD FOR PROCESSING AUDIO SIGNAL AND RELATED PRODUCTS

CROSS-REFERENCE TO RELATED APPLICATION(S)

This application claims priority to Chinese Patent Application Serial No. 201810289086.2, filed on Mar. 30, 2018, the entire disclosure of which is hereby incorporated by reference.

TECHNICAL FIELD

This disclosure relates to the technical field of audio, and more particularly to a method for processing audio signal, an electronic device, and an earphone.

BACKGROUND

At present, when users use earphones to listen to music and answer calls, some control operations such as playing, pausing, adjusting volume, song switching, call switching, and the like may be involved. These control operations can be realized by performing operations on a related page of a music application downloaded in advance in a terminal, or preset control buttons of the earphone.

However, when performing operations on the related page of the music application, the user needs to manually perform these operations, which is cumbersome. When performing operations on the preset control buttons of the earphone, the user needs to find a wired control button or a touch button disposed at a certain position of the earphone, and then performs a corresponding operation, which is easy to trigger a wrong control operation, thereby reducing operation efficiency, and bringing inconvenience to the user.

SUMMARY

Implementations of the disclosure provide a method for processing audio signal, an electronic device, and an earphone.

In a first aspect, a method for processing audio signal is provided. The method includes the following.

An input operation of a user performed on an earphone is received, and an acoustic echo impulse response at a position of the user's ear canal where the earphone currently stays is determined according to an audio signal currently played by the earphone and a vibration signal generated by the input operation. A directive instruction corresponding to the input operation is identified at least according to the acoustic echo impulse response. An electronic device in communication with the earphone is controlled to execute a corresponding operation for a preset application in the electronic device according to the directive instruction. The preset application is an application corresponding to the audio signal currently played by the earphone.

In a second aspect, an earphone is provided. The earphone includes at least one processor and a computer readable memory, coupled with the at least one processor and storing at least one computer executable instruction therein which, when executed by the at least one processor, causes the at least one processor to perform following actions. An input operation of a user performed on the earphone is received, and an acoustic echo impulse response at a position of the user's ear canal where the earphone currently stays is determined according to an audio signal currently played by the earphone and a vibration signal generated by the input operation. A directive instruction corresponding to the input operation is identified at least according to the acoustic echo impulse response. An electronic device in communication with the earphone is controlled to execute a corresponding operation for a preset application according to the directive instruction. The preset application is an application corresponding to the audio signal currently played by the earphone.

In a third aspect, an electronic device is provided. The electronic device includes at least one processor and a computer readable memory, coupled with the at least one processor and storing at least one computer executable instruction therein which, when executed by the at least one processor, causes the at least one processor to perform following actions. An input operation of a user performed on an earphone in communication with the electronic device is received, and an acoustic echo impulse response at a position of the user's ear canal where the earphone currently stays is determined according to an audio signal currently played by the earphone and a vibration signal generated by the input operation. A directive instruction corresponding to the input operation is identified at least according to the acoustic echo impulse response. A corresponding operation is executed for a preset application in the electronic device according to the directive instruction. The preset application is an application corresponding to the audio signal currently played by the earphone.

BRIEF DESCRIPTION OF DRAWINGS

To describe technical solutions in implementations of the present disclosure or in the related art more clearly, the following briefly introduces the accompanying drawings required for describing the implementations or the related art. Apparently, the accompanying drawings in the following description illustrate some implementations of the present disclosure. Those of ordinary skill in the art may also obtain other drawings based on these accompanying drawings without creative efforts.

DETAILED DESCRIPTION

Figure 1:
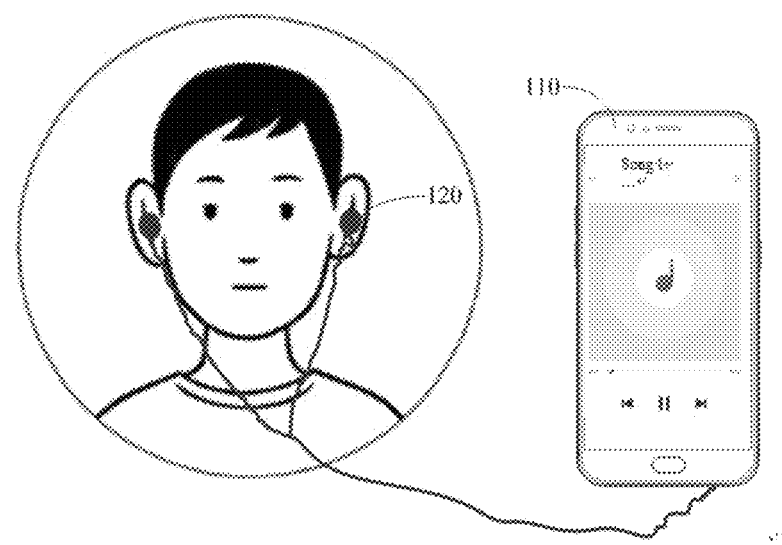
FIG. 1 is a schematic diagram illustrating an application scenario of a method for processing audio signal according to an implementation of the present disclosure.

For illustrating objects, technical solutions, and advantages of the implementations of the present disclosure more clearly, the following will further illustrate the present disclosure in detail through implementations with reference to the accompanying drawings. It will be appreciated that the implementations described herein are for the purpose of explaining the disclosure rather than limiting the disclosure.

The terms "first" and "second" used in the present disclosure may be used to describe various elements, but these elements are not limited by these terms. These terms are merely used to distinguish one element from another. For example, without departing from the scope of the present disclosure, a first acquiring unit may be referred as a second acquiring unit, and similarly, the second acquiring unit may be referred as the first acquiring unit. Both the first acquiring unit and the second acquiring unit are acquiring units, but they are not the same acquiring unit.

In a first aspect, a method for processing audio signal is provided. The method includes the following. An input operation of a user performed on an earphone is received, and an acoustic echo impulse response at a position of the user's ear canal where the earphone currently stays is determined according to an audio signal currently played by the earphone and a vibration signal generated by the input operation. A directive instruction corresponding to the input operation is identified at least according to the acoustic echo impulse response. An electronic device in communication with the earphone is controlled to execute a corresponding operation for a preset application according to the directive instruction. The preset application is an application corresponding to the audio signal currently played by the earphone.

In an implementation, determining the acoustic echo impulse response at the position of the user's ear canal where the earphone currently stays according to the audio signal currently played by the earphone and the vibration signal generated by the input operation includes the following. The audio signal currently played by the earphone and the vibration signal is acquired. A acoustic echo signal generated by reflection and vibration of the audio signal and the vibration signal through the ear canal is recorded. The acoustic echo impulse response at the position of the user's ear canal where the earphone currently stays according to the acoustic echo signal is determined.

In an implementation, identifying the directive instruction corresponding to the input operation at least according to the acoustic echo impulse response includes the following. In a preset time period, a response parameter of the acoustic echo impulse response is acquired, where the response parameter at least contains a response position and response times. The directive instruction corresponding to the input operation is identified according to the response parameter.

In an implementation, identifying the directive instruction corresponding to the input operation at least according to the acoustic echo impulse response includes the following. Whether the acoustic echo impulse response is matched with one of a plurality of preset acoustic echo impulse responses stored in a preset database is determined. The directive instruction corresponding to the input operation is determined according to the acoustic echo impulse response based on a determination that the acoustic echo impulse response is matched with one preset acoustic echo impulse response stored in the preset database In an implementation, identifying the directive instruction corresponding to the input operation at least according to the acoustic echo impulse response includes the following. In a preset time period, a response parameter of the acoustic echo impulse response is acquired, where the response parameter at least contains a response position and response times. An application type of the preset application is acquired. The directive instruction corresponding to the input operation is identified according to the response parameter and the application type of the preset application.

In an implementation, receiving the input operation on the earphone includes the following. Feature information of the vibration signal is acquired. Whether the vibration signal is generated by the input operation of the user is determined according to the feature information. Determining the acoustic echo impulse response at the position of the user's ear canal where the earphone currently stays according to the audio signal currently played by the earphone and the vibration signal generated by the input operation includes the following. The acoustic echo impulse response at the position of the user's ear canal where the earphone currently stays is determined according to the audio signal and the vibration signal based on a determination that the vibration signal is generated by the input operation of the user.

In an implementation, the corresponding operation executed for the preset application according to the directive instruction includes any one of the following: opening the preset application, closing the preset application, pausing a multimedia file currently played, adjusting volume of the multimedia file currently played, switching the multimedia file currently played, bookmarking the multimedia file currently played, downloading the multimedia file currently played, and ending a call or a recording.

In a second aspect, an earphone is provided. The earphone includes at least one processor and a computer readable memory, coupled with the at least one processor and storing at least one computer executable instruction therein which, when executed by the at least one processor, causes the at least one processor to perform following actions. An input operation of a user performed on the earphone is received, and an acoustic echo impulse response at a position of the user's ear canal where the earphone currently stays is determined according to an audio signal currently played by the earphone and a vibration signal generated by the input operation. A directive instruction corresponding to the input operation is identified at least according to the acoustic echo impulse response. An electronic device in communication with the earphone is controlled to execute a corresponding operation for a preset application according to the directive instruction. The preset application is an application corresponding to the audio signal currently played by the earphone.

In a third aspect, an electronic device is provided. The electronic device includes at least one processor and a computer readable memory, coupled with the at least one processor and storing at least one computer executable instruction therein which, when executed by the at least one processor, causes the at least one processor to perform following actions. An input operation of a user performed on an earphone in communication with the electronic device is received, and an acoustic echo impulse response at a position of the user's ear canal where the earphone currently stays is determined according to an audio signal currently played by the earphone and a vibration signal generated by the input operation. A directive instruction corresponding to the input operation is identified at least according to the acoustic echo impulse response. A corresponding operation is executed for a preset application according to the directive instruction. The preset application is an application corresponding to the audio signal currently played by the earphone.

FIG. 1 is a schematic diagram illustrating an application scenario of a method for processing audio signal according to an implementation of the present disclosure. As illustrated in FIG. 1, the application scenario includes an electronic device 110 and an earphone 120 in communication with the electronic device 110.

The earphone 120 may be in different types such as an in-ear wired/wireless earphone, an earplug wired/wireless earphone. The electronic device 110 and the earphone 120 can implement data transmission via wired communication or wireless communication. An earpiece/speaker of the earphone 120 is located in an internal structure (ear canal) of a user's ear.

Figure 2:
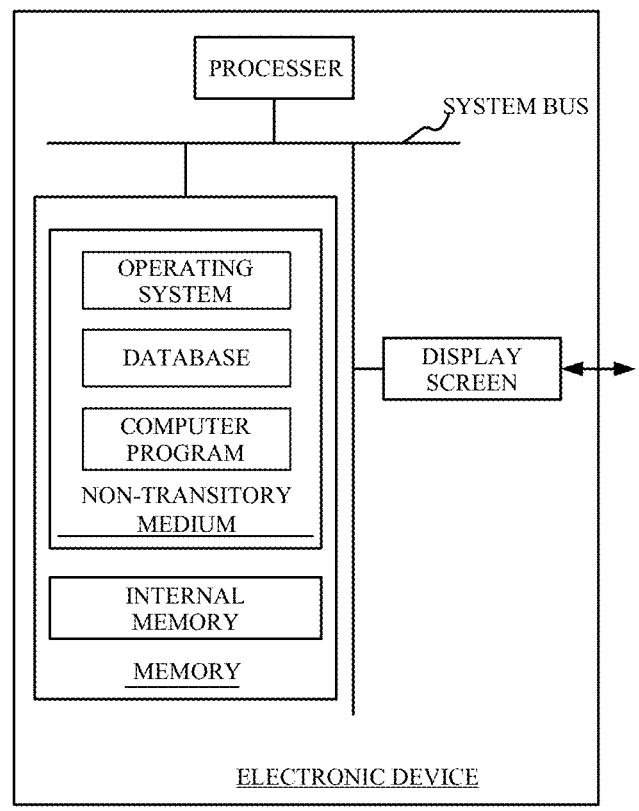
FIG. 2 is a schematic structural diagram illustrating an inner structure of an electronic device according to an implementation of the present disclosure.

FIG. 2 is a schematic structural diagram illustrating an inner structure of an electronic device according to an implementation of the present disclosure. The electronic device 110 includes a processor, a memory, and a display screen that are coupled with each other via a system bus. The processor is configured to provide computation and control functions to support the operation of the electronic device 110. The memory is configured to store data, programs, and/or instruction codes, etc. At least one computer program is stored in the memory. The least one computer program can be executed by the processor to implement the method for processing audio signal, which is applicable to the electronic device 110, according to the implementations of the disclosure. The memory may include a non-transitory storage medium such as a magnetic disk, a compact disk (CD), a read-only memory (ROM), or a random-access-memory (RAM), or the like. For example, in one implementation, the memory includes a non-transitory storage medium and an internal memory. The non-transitory storage medium is configured to store an operating system, a database, and computer programs. The database is configured to store data related to implementation of the method for processing audio signals according to the implementations of the present disclosure. The computer programs can be executed by the processor to implement the method for processing audio signal according to the implementations of the present disclosure. The internal memory is configured to provide a caching operating environment for the operating system, the database, and the computer programs in the non-transitory storage medium. The display screen may be a touch screen, such as a capacitive screen or an electronic screen, and is configured to display interface information of the electronic device 110. The display screen can be operable in a screen-on state and screen-off state. The electronic device 110 may be a mobile phone, a tablet PC, a personal digital assistant (PDA), a wearable device, or the like.

Those skilled in the art can understand that the structure illustrated by the block diagram of FIG. 2 is merely a partial structure related to the technical solutions of the present disclosure, and does not constitute any limitation for the electronic device 110 to which the technical solutions of the present disclosure are applied. The electronic device 110 can include more or fewer components than illustrated in the figures or be provided with different components, or certain components can be combined.

Figure 3:
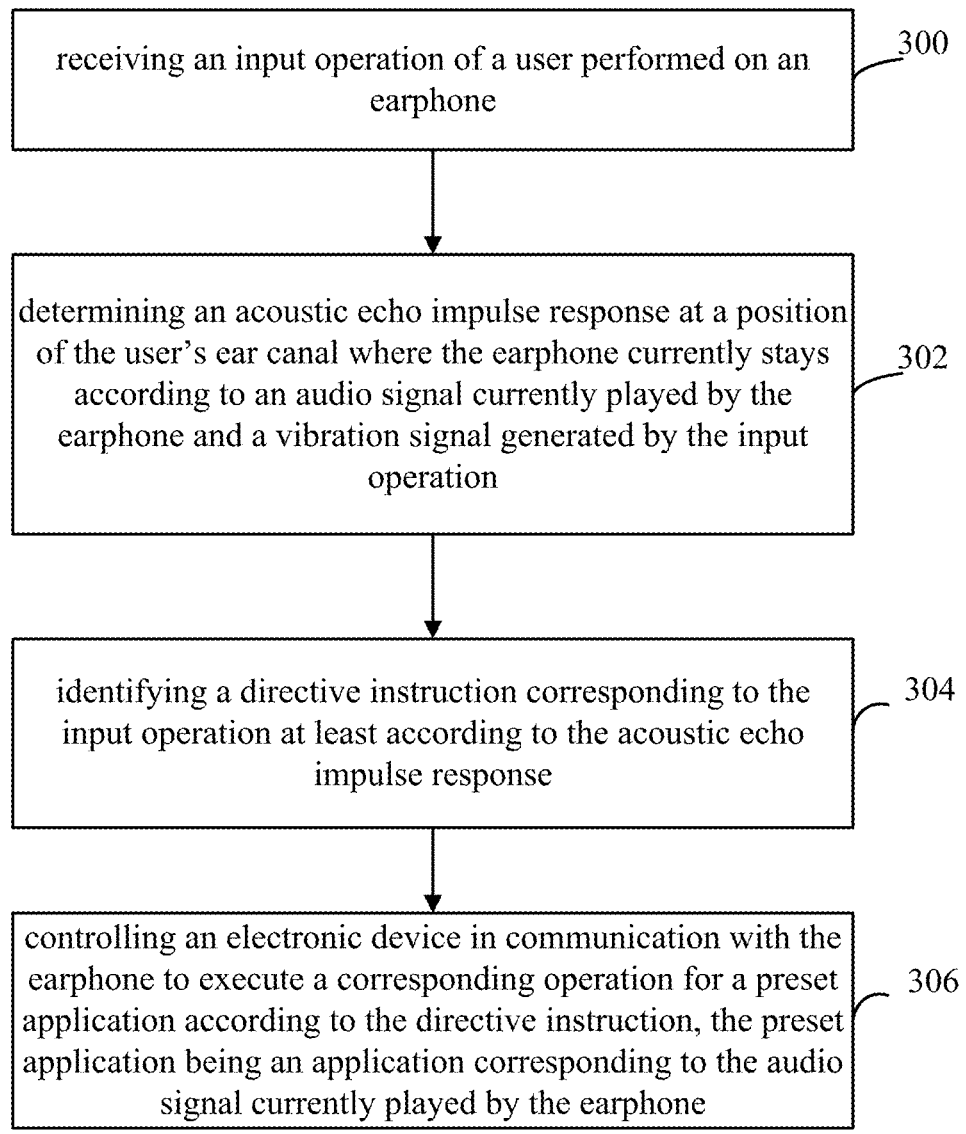
FIG. 3 is a schematic flow chart illustrating a method for processing audio signal according to an implementation of the present disclosure.

FIG. 3 is a schematic flow chart illustrating a method for processing audio signal according to an implementation of the present disclosure. Take being implemented by the earphone illustrated in FIG. 1 as an example, the method for processing audio signal in this implementation is illustrated. As illustrated in FIG. 3, the method includes the following.

At block 300, an input operation of a user performed on the earphone is received.

At block 302, an acoustic echo impulse response at a position of the user's ear canal where the earphone currently stays is determined according to an audio signal currently played by the earphone and a vibration signal generated by the input operation.

When using the earphone to answer a call or listen to music, the user can perform an input operation such as tapping, pressing, or the like on any position of a shell of the earphone. An earpiece of the earphone is located in the ear canal of the user. When the earphone receives the input operation, the input operation generates a corresponding vibration signal. The vibration signal can be understood as a sound signal generated by the input operation and collected by the earpiece of the earphone. The acoustic echo impulse response associated with the position where the earphone currently stays is obtained according to the audio signal currently played by the earphone and the vibration signal generated by the input operation. The acoustic echo impulse response can be understood as a spatial feature(s) of the user's ear canal where the earphone currently stays. That is, different acoustic echo impulse responses can be used to indicate different positions of the user's ear canal where the earphone stays.

When the user performs the input operation on the earphone, the position of the user's ear canal where the earphone stays is changed. The acoustic echo impulse response indicating the spatial feature of the ear canal where the earphone currently stays can be obtained according to reflection and vibration of the audio signal currently played and the vibration signal generated by the input operation through the ear canal.

It can be understood that, the audio signal may be a multimedia file currently played, a voice signal of the user himself/herself or a contact during the call, or an audio signal beyond a normal human hearing range (the audio signal higher than 20 KHz) and cannot be heard by the user even if the earphone is placed in the ear of the user.

At block 304, a directive instruction corresponding to the input operation is identified at least according to the acoustic echo impulse response.

According to a pre-stored mapping relationship between acoustic echo impulse responses and positions of the user's ear canal where the earphone stays, information of a position of the user's ear canal where the earphone currently stays can be obtained. According to the information of the position, an occurrence frequency of the acoustic echo impulse response, and the like, the directive instruction corresponding to the input operation can be identified. The directive instruction is configured to direct an electronic device interacting with the earphone to perform a corresponding control operation for the audio signal currently played.

At block 306, the electronic device in communication with the earphone is controlled to execute a corresponding operation for a preset application according to the directive instruction. The preset application is an application corresponding to the audio signal currently played by the earphone.

The corresponding operation is executed for the preset application according to the directive instruction, where the preset application is the application corresponding to the audio signal currently played by the earphone. The application may be a music player, such as Kugou® music, QQ Music®, Kuwo Music®, Netease® cloud music, Baidu® music, Xiami® music, etc. The application may also be a video player, such as iQiyi®, Tencent® video, StormPlayer, etc. The application may also be a radio player, such as Tornado FM, Dragonfly FM, Lizhi® FM, Ximalaya®, etc. The application may also be a communication application, such as Skype®, or the like.

According to the audio signal currently played by the earphone, the corresponding operation is performed for the preset application corresponding to the audio signal. This operation may be playing, pausing, adjusting volume, switching, searching, bookmarking, downloading, or sharing the audio signal currently played. This operation may also be closing the preset application, and may also be initiating a phone call, ending a phone call, recording, or the like.

According to the method for processing audio signal, when the input operation of the user performed on the earphone is received, the acoustic echo impulse response associated with the position where the earphone currently stays is determined according to the audio signal currently played. The directive instruction corresponding to the input operation is then identified according to the acoustic echo impulse response, thereby improving identification of the input operation. Meanwhile, the corresponding operation is executed for the preset application according to the directive instruction, thereby achieving control for the preset application, realizing convenience, simplifying user operation, and improving use efficiency and user experience.

What needs to be illustrated is that a method similar to the above illustrated method can be implemented by the electronic device, that is, the electronic device can receive the input operation on the earphone, determine the acoustic echo impulse response, identify the directive instruction corresponding to the input operation, and execute the corresponding operation for the preset application, and details will not be repeated herein.

Figure 4:
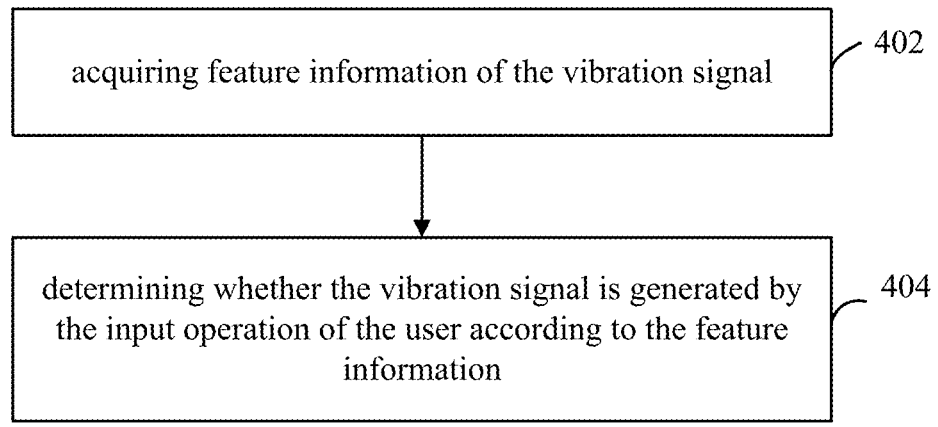
FIG. 4 is a schematic flow chart illustrating receiving a user's input operation performed on an earphone according to an implementation of the present disclosure.

As illustrated in FIG. 4, in one implementation, receiving the user's input operation on the earphone includes the following.

At block 402, feature information of the vibration signal is acquired.

The input operation may be any operation such as tapping, pressing, or the like performed by the user on any position of the shell of the earphone. An electroacoustic transducer for playing an audio signal can acquire a sound signal generated by tapping, pressing, or the like, and the sound signal generated by tapping, pressing, or the like and acquired by the electroacoustic transducer is taken as a vibration signal.

Since tapping or pressing is of short duration and the vibration signal is transmitted through the earphone in the form of solid, the vibration signal generated by tapping or pressing is different from a vibration signal generated by other forces or a vibration signal generated by an external vibration source that is transmitted through the earphone.

Since the earphone is built with the electroacoustic transducer, the vibration signal can be converted into an analog electronic signal via the electroacoustic transducer, and then the analog electronic signal is converted into a digital signal, to acquire feature information of the digital signal. The feature information of the digital signal contains a vibration frequency and a vibration amplitude. In addition, other feature information can also be contained.

At block 404, whether the vibration signal is generated by the input operation of the user is determined according to the feature information.

According to the feature information of the digital signal, whether the vibration signal is generated by the input operation of the user can be determined. In one implementation, whether the feature information of the digital signal satisfies a preset condition is determined. The preset condition may contain a preset vibration frequency and a preset vibration amplitude. When the feature information acquired satisfies the preset condition, the vibration signal is determined to be generated by the input operation of the user.

In the implementation, when the vibration signal is generated by the input operation of the user, the acoustic echo impulse response at the position of the user's ear canal where the earphone currently stays is determined according to the audio signal and the vibration signal.

According to the method for processing audio signal in the implementation of the disclosure, a wrong operation triggered by any input operation can be avoided, and an action for acquiring a current acoustic echo impulse response can be triggered accurately.

Alternatively, the vibration signal of the earphone can also be acquired through a three-axis inertial sensor built in the earphone. The vibration signal can be understood as posture information indicating movement of the earphone due to tapping or pressing. When the vibration signal is the posture information of the earphone, the feature information of the vibration signal can be understood as three-axis acceleration information of the earphone. When the three-axis acceleration information acquired satisfies a preset three-axis acceleration condition, the vibration signal is determined to be generated by the input operation of the user.

Figure 5:
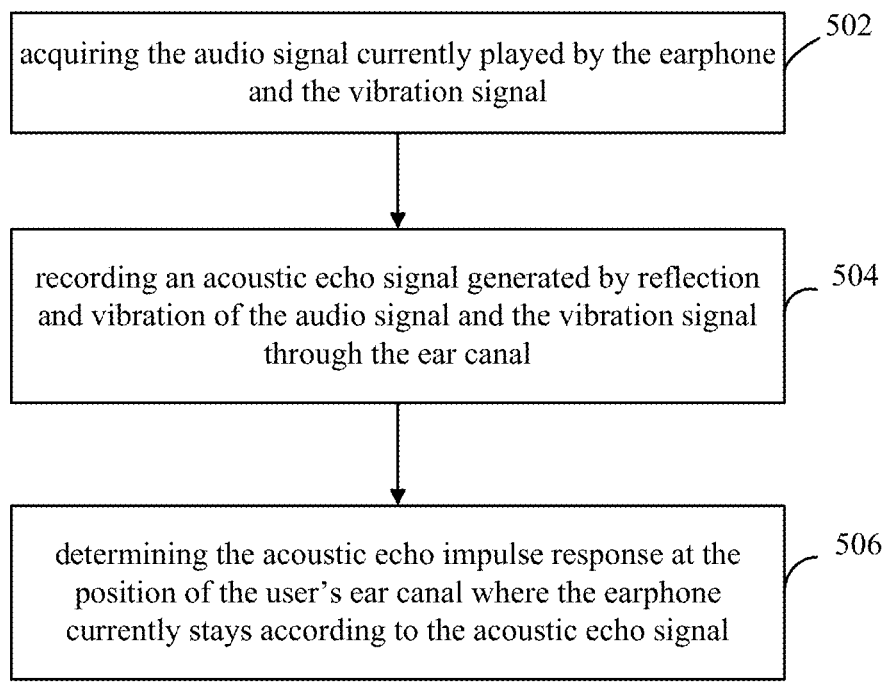
FIG. 5 is a schematic flow chart illustrating determining, according to an audio signal currently played, an acoustic echo impulse response associated with a position where the earphone currently stays according to an implementation of the present disclosure.

As illustrated in FIG. 5, in one implementation, determining the acoustic echo impulse response associated with the position where the earphone currently stays according to the audio signal currently played includes the following.

At block 502, the audio signal currently played by the earphone and the vibration signal are acquired.

The audio signal currently played by the earphone is acquired. The audio signal may be a music or a voice signal generated by a multimedia file currently played by the preset application, or a sound signal beyond the normal human hearing range. The audio signal may also be a voice signal of the user himself/herself or a contact during the call.

The input operation may be any operation such as tapping, pressing, or the like performed by the user on any position of the shell of the earphone. An electroacoustic transducer for playing an audio signal can acquire a sound signal generated by tapping, pressing, or the like, and the sound signal generated by the tapping, pressing, or the like and acquired by the electroacoustic transducer is taken as a vibration signal.

Since tapping or pressing is of short duration and the vibration signal is transmitted through the earphone in the form of solid, the vibration signal generated by tapping or pressing is different from a vibration signal generated by other forces or a vibration signal generated by an external vibration source that is transmitted through the earphone.

At block 504, an acoustic echo signal generated by reflection and vibration of the audio signal and the vibration signal through the ear canal is recorded.

In one implementation, the earphone includes the electroacoustic transducer. The electroacoustic transducer can be acted as a speaker to convert an electrical signal corresponding to the audio signal into an acoustic wave signal that can be heard by users. The electroacoustic transducer is sensitive to acoustic waves in the user's ear canal (the internal structure of the ear). The acoustic waves can cause vibration of a speaker cone and drive a coil connected to the speaker cone to perform a motion of cutting magnetic lines in a magnetic field of a permanent magnet, thereby inducing a current that varies with the acoustic waves (physically called electromagnetic induction). In addition, an electromotive force of the audio signal is output at both ends of the coil. Therefore, the electroacoustic transducer can record the acoustic echo signal generated by the reflection and vibration of the audio signal and the vibration signal generated by the input operation through the ear canal. In other words, the electroacoustic transducer can be used as a microphone.

Although different in types, functions, or operation states, electroacoustic transducers all include two basic components, that is, an electrical system and a mechanical vibration system. Inside the electroacoustic transducer, the electrical system and the mechanical vibration system are coupled with each other through some physical effect to realize energy conversion.

The electroacoustic transducer based on the audio signal can record the acoustic echo signal generated by the reflection and the vibration of the audio signal and the vibration signal through the ear canal, and therefore, there is no need to provide an additional microphone for the earphone to collect acoustic echo signals, thereby saving cost and simplifying the inner structure of the earphone.

Alternatively, the acoustic echo signal generated by the reflection and the vibration of the audio signal and the vibration signal through the ear canal can also be collected by a microphone of the earphone. When the earphone is placed into the user's ear, the microphone is at one side of the earphone that contacts the ear canal of the user, that is, the microphone is disposed on the shell of the earphone in which a through hole for a speaker is defined.

At block 506, the acoustic echo impulse response at the position of the user's ear canal where the earphone currently stays is determined according to the acoustic echo signal.

The acoustic echo signal can be expressed as follows:

$$r(t)=[s(t)+z(t)]*w(t) \qquad (1)$$

where s(t) represents the audio signal played by the speaker of the earphone, z(t) represents the vibration signal, r(t) represents the acoustic echo signal in the ear canal and collected by the microphone, and w(t) represents the acoustic echo impulse response associated with the position where the earphone currently stays.

In detail, w(t) is a parameter that can indicate the coupling between the earphone and the user's ear, and can be used to indicate an acoustic feature of a space of the user's ear where the earphone is placed. In the formula (1), the audio signal s(t), the vibration signal z(t), and the acoustic echo signal r(t) can be obtained by monitoring of an audio circuit arranged in the earphone or the electronic device, thereby further obtaining the acoustic echo impulse response w(t) associated with the position where the earphone currently stays. The acoustic echo impulse response w(t) can be understood as the spatial feature of the user's ear canal where the earphone currently stays. That is, different acoustic echo impulse responses can indicate different positions of the user's ear where the earphone stays. Accordingly, the acoustic echo impulse response w(t) can also be used to indicate earprint features of the user.

Furthermore, a noise factor e(t) may be introduced to the above formula (1). The noise factor e(t) includes ambient noise and circuit noise. The ambient noise is generated during recording of the acoustic echo signal when no audio signal s(t) is played. The ambient noise can be acquired by an additional microphone. The circuit noise is caused by a built-in circuit of the earphone and is an inherent property of the earphone. The noise factor e(t) introduced is a known parameter. After introducing the noise factor e(t), the above formula (1) may be modified to:

$$r(t)=[s(t)+z(t)]*w(t)+e(t) \qquad (2)$$

In the formula (2), the audio signal s(t), the acoustic echo signal r(t), the vibration signal z(t), and the noise factor e(t) newly introduced are known parameters, therefore, the acoustic echo impulse response w(t) associated with the position where the earphone currently stays can be obtained accordingly.

Figure 6:
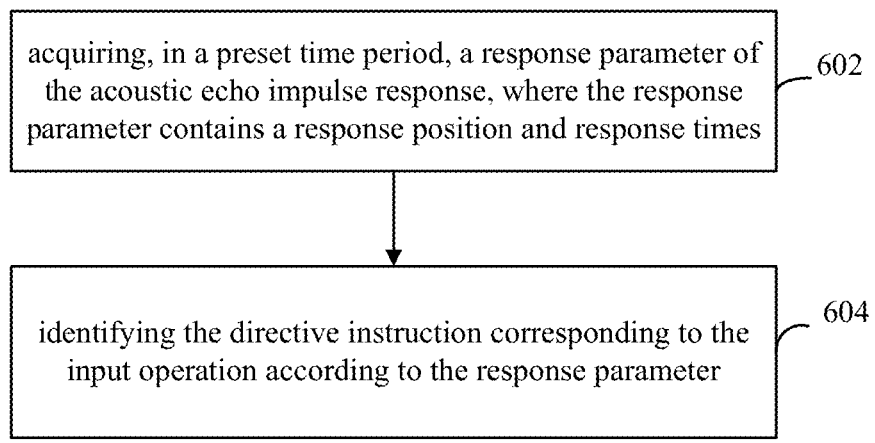
FIG. 6 is a schematic flow chart illustrating identifying, according to the acoustic echo impulse response, a directive instruction corresponding to an input operation according to an implementation of the present disclosure.

As illustrated in FIG. 6, in one implementation, identifying the directive instruction corresponding to the input operation at least according to the acoustic echo impulse response includes the following.

At block 602, in a preset time period, a response parameter of the acoustic echo impulse response is acquired. The response parameter contains a response position and response times.

The response parameter of the acoustic echo impulse response is acquired in the preset time period, where the response parameter contains the response position and the response times. The response position can be understood as information of a position corresponding to each acoustic echo impulse response that is acquired in the preset time period, where the position is a position of the user's ear canal where the earphone currently stays. The response times can be understood as a total number of occurrences of acoustic echo impulse responses in the preset time period, which can also be understood as the number of times that the earphone stays at a same position of the user's ear canal in the preset time period. While recording the response position and the response number, timing can also be considered, that is, in the preset time period, the response parameters of acoustic echo impulse responses are recorded in chronological order.

Alternatively, the response parameter may further contain a response duration. That is, after tapping or pressing the earphone, the user still touches the earphone without leaving from the earphone immediately, the response duration can be obtained. The response duration can be understood as a duration that the user taps or presses the earphone once.

What needs to be illustrated is that the response parameter is a combination of the response position and the response times, where the response timing further needs to be considered. If the response parameter further contains the response duration, the response parameter is a combination of the response position, the response times, the response duration, and the response timing.

At block 604, the directive instruction corresponding to the input operation is identified according to the response parameter.

The directive instruction corresponding to the input operation is identified according to the response parameter. In the preset time period, one response parameter corresponds to one directive instruction. For example, if the response parameter indicates that the earphone is in a first position and the response times when in the first position is once, a corresponding directive instruction is for pausing the audio currently played. If the response parameter indicates that the earphone is in a second position and the response times when in the second position is once, a corresponding directive instruction is for resuming playing of the audio that is paused at current time. If the response parameter indicates that the earphone is in the first position and the response times when in the first position is twice, a corresponding directive instruction is for turning up the volume. If the response parameter indicates that the earphone is in the second position and the response times when in the second position is twice, a corresponding directive instruction is for turning down the volume. If the response parameter indicates that the earphone is in the first position and the response times when in the first position is thrice, a corresponding directive instruction is for switching to a next song. If the response parameter indicates that the earphone is in the second position and the response times when in the second position is thrice, a corresponding directive instruction is for closing the preset application that currently plays the multimedia file. If the response parameter indicates that the response times is twice (including a first time and a second time), where the response position corresponding to the first time is the first position and the response position corresponding to the second time is the second position, a corresponding directive instruction is for bookmarking the multimedia file currently played. If the response parameter indicates that the response times is twice (including a first time and a second time), where the response position corresponding to the first time is the second position and the response position corresponding to the second time is the first position, a corresponding directive instruction is for downloading the multimedia file currently played. If the response parameter indicates that the response times is thrice (including a first time, a second time, and a third time), where the response position corresponding to the first time is the first position, the response position corresponding to the second time is the second position, and the response position corresponding to the third time is a third position, a corresponding directive instruction is for searching for favorite songs of the user, where the favorite songs of the user are the top ten songs with the highest historical playing frequency. If the response parameter indicates that the response times is thrice (including a first time, a second time, and a third time), where the response position corresponding to the first time is the third position, the response position corresponding to the second time is the second position, and the response position corresponding to the third time is the first position, a corresponding directive instruction is for sharing the multimedia file currently played, where "sharing" can be understood as sharing the multimedia file currently played with a preset contact(s), third party software, or the like. Moreover, a correspondence relationship between response parameters and directive instructions may also be established according to usage habits of the user, and not limited to the above examples. Herein not all examples are enumerated.

Figure 7:
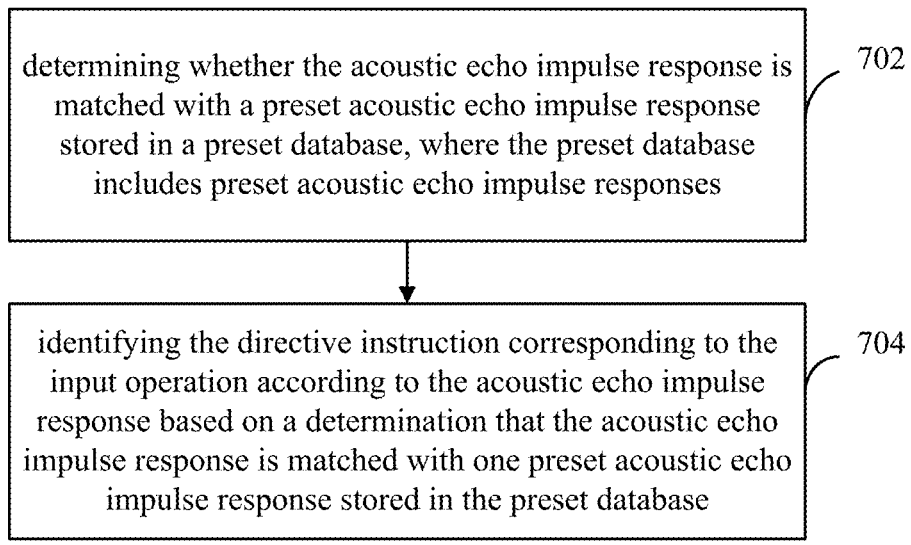
FIG. 7 is a schematic flow chart illustrating identifying, according to the acoustic echo impulse response, a directive instruction corresponding to an input operation according to another implementation of the present disclosure.

As illustrated in FIG. 7, in one implementation, identifying the directive instruction corresponding to the input operation according to the acoustic echo impulse response includes the following.

At block 702, whether the acoustic echo impulse response is matched with a preset acoustic echo impulse response stored in a preset database is determined, where the preset database includes multiple preset acoustic echo impulse responses.

Since the acoustic echo impulse response can indicate the feature of a space where the earphone currently stays, an acoustic signature can be generated according to the acoustic echo impulse response. Prior to execution of the method for processing audio signal, user input may also be received for registration. In one implementation, the electronic device may display a user interface for prompting the user to register and providing step-by-step instructions for registration to the user. The step-by-step instructions, for example, may be placing the earphone in the user's ear canal, adjusting the position of the earphone in the ear canal, confirming that a clear audio signal can be heard, and so on. In the process of registration, multiple acoustic signatures (5-10) of one group (left or right ear) or two groups (left and right ears) may be stored in the preset database. Different acoustic signatures correspond to features of the space where the earphone currently stays, that is, different positions of the ear canal where the earphone stays. In one implementation, multiple acoustic signatures of one group or two groups of multiple users may also be stored in the preset database.

A corresponding acoustic signature is generated according to the acoustic echo impulse response acquired. The corresponding acoustic signature is compared with the multiple acoustic signatures stored in the preset database. If there is a match between the corresponding acoustic signature and any acoustic signature in the preset database, the acoustic echo impulse response acquired is determined to be stored in the preset database.

At block 704, when the acoustic echo impulse response is matched with one preset acoustic echo impulse response, the directive instruction corresponding to the input operation is identified according to the acoustic echo impulse response. As illustrated above, the directive instruction corresponding to the input operation can be identified according to the response parameter of the acoustic echo impulse response.

Figure 8:
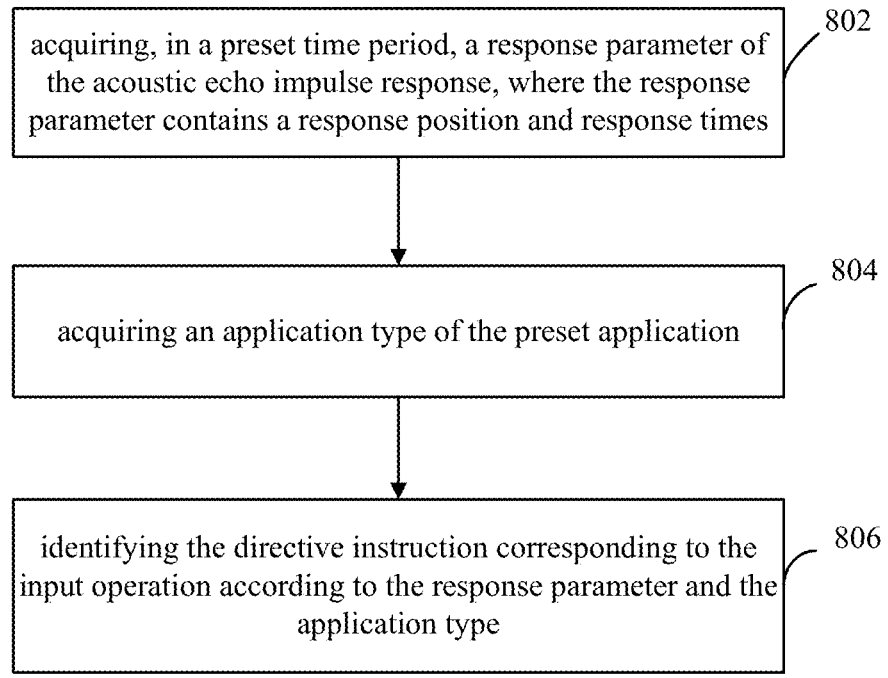
FIG. 8 is a schematic flow chart illustrating identifying, according to the acoustic echo impulse response, a directive instruction corresponding to an input operation according to yet another implementation of the present disclosure.

As illustrated in FIG. 8, in one implementation, identifying the directive instruction corresponding to the input operation at least according to the acoustic echo impulse response includes the following.

At block 802, in a preset time period, a response parameter of the acoustic echo impulse response is acquired. The operation at block 802 corresponds to the operation at block 602, and will not be repeated herein.

At block 804, an application type of the preset application is acquired.

The preset application is the application corresponding to the audio signal currently played by the earphone. The application may be a music player, such as Kugou® music, QQ® music, Kuwo Music®, Netease® cloud music, Baidu® music, Xiami® music, etc. The application may also be a video player, such as iQiyi®, Tencent® video, StormPlayer, etc. The application may also be a radio player, such as Tornado FM, Dragonfly FM, Lizhi® FM, Ximalaya®, etc. The application may also be a communication application, such as Skype®, or the like. According to the audio signal currently played by the earphone, the application type of the preset application corresponding to the audio signal can be acquired.

At block 806, the directive instruction corresponding to the input operation is identified according to the response parameter and the application type.

Different preset applications can identify different input operations. For example, a preset application of the music player type can identify the greatest number of input operations, but a preset application of the communication type can identify the least number of input operations. Meanwhile, for preset applications of different application types, the same input operation corresponds to different directive instructions. That is, the preset application can identify the identifiable directive instruction corresponding to the current input operation according to the current input operation.

For example, in the case that the preset application is of the music player type and the response parameter corresponding to the input operation indicates that the earphone is in the first position and the response times when in the first position is twice, a corresponding directive instruction is for turning up the volume. In the case that the preset application is of the video player type and the response parameter corresponding to the input operation indicates that the earphone is in the first position and the response times when in the first position is twice, a corresponding directive instruction is for increasing brightness. In the case that the preset application is of the radio player type and the response parameter corresponding to the input operation indicates that the earphone is in the first position and the response times when in the first position is twice, a corresponding directive instruction is for switching to a frequency channel bookmarked by the user. In the case that the preset application is of the communication application type and the response parameter corresponding to the input operation indicates that the earphone is in the first position and the response times when in the first position is twice, a corresponding directive instruction is for ending a call.

The preset application currently playing the audio signal can be determined according to the audio signal currently played by the earphone. The preset application can identify the directive instruction corresponding to the input operation. For example, in the case that the preset application is of the communication application type and the response parameter corresponding to the input operation indicates that the earphone is in the second position and the response times when in the second position is twice, the communication application can identify that a directive instruction corresponding to the input operation is for recording a current call.

What needs to be illustrated is that the mapping relationship between application types of preset applications, response parameters, and directive instructions may be set according to the user's usage habits, which is not limited to the above examples.

The corresponding operation is performed for the preset application according to the directive instruction identifiable for the preset application. For example, if the directive instruction is for recording the current call, the electronic device can record voice information of the current call.

According to the method for processing audio signal in the foregoing implementations, the preset applications of different types can be controlled correspondingly according to the application types of the preset applications, thereby achieving diversified control and improving user experience.

Figure 9:
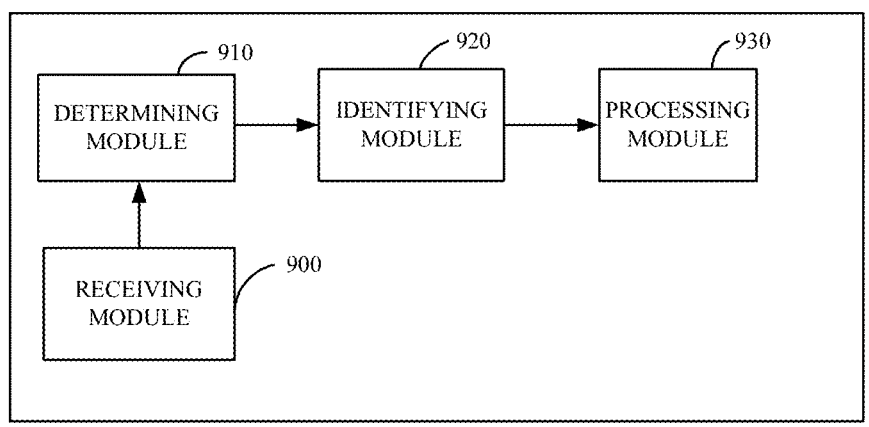
FIG. 9 is a schematic structural diagram illustrating a device for processing audio signal according to an implementation of the present disclosure.

FIG. 9 is a schematic structural diagram illustrating a device for processing audio signal according to an implementation of the present disclosure. The device may be implemented by an earphone. The device includes a receiving module 900, a determining module 910, an identifying module 920, and a processing module 930.

The receiving module 900 is configured to receive an input operation of a user performed on the earphone.

The determining module 910 is configured to determine an acoustic echo impulse response at a position of the user's ear canal where the earphone currently stays according to an audio signal currently played by the earphone and a vibration signal generated by the input operation.

The identifying module 920 is configured to identify a directive instruction corresponding to the input operation at least according to the acoustic echo impulse response.

The processing module 930 is configured to control an electronic device in communication with the earphone to execute a corresponding operation for a preset application in the electronic device according to the directive instruction.

The preset application is an application corresponding to the audio signal currently played by the earphone.

What needs to be illustrated is that a device similar to the above illustrated device may be implemented by an electronic device, that is, the electronic device is enabled to receive the input operation on the earphone in communication with the electronic device, determine the acoustic echo impulse response, identify the directive instruction corresponding to the input operation, and execute the corresponding operation for the preset application, and details will not be repeated herein.

According to the device for processing audio signal, when the input operation of the user performed on the earphone is received, the acoustic echo impulse response associated with the position where the earphone currently stays is determined according to the audio signal currently played. The directive instruction corresponding to the input operation is then identified at least according to the acoustic echo impulse response, which can improve identification of the input operation. Meanwhile, the corresponding operation is executed for the preset application according to the directive instruction, thereby achieving control for the preset application, realizing convenience, greatly simplifying user operation, and improving use efficiency and user experience.

In one implementation, the determining module 910 includes a first acquiring unit (not illustrated in the figures), a recording unit (not illustrated in the figures), and a first determining unit (not illustrated in the figures).

The first acquiring unit is configured to acquire the audio signal currently played by the earphone and the vibration signal.

The recording unit is configured to record an acoustic echo signal generated by reflection and vibration of the audio signal and the vibration signal through the ear canal.

The first determining unit is configured to determine the acoustic echo impulse response at the position of the user's ear canal where the earphone currently stays according to the acoustic echo signal.

In one implementation, the identifying module 920 includes a second acquiring unit (not illustrated in the figures) and an identifying unit (not illustrated in the figures).

The second acquiring unit is configured to acquire, in a preset time period, a response parameter of the acoustic echo impulse response. The response parameter contains a response position, response times, and a response duration, or contains a response position and response times.

The identifying unit is configured to identify the directive instruction corresponding to the input operation according to the response parameter.

In one implementation, the identifying module 920 further includes a creating unit (not illustrated in the figures), a judging unit (not illustrated in the figures), and the identifying unit.

The creating unit is configured to create a preset database for storing preset acoustic echo impulse responses.

The judging unit is configured to determine whether the acoustic echo impulse response is stored in the preset database.

The identifying unit is further configured to identify the directive instruction corresponding to the input operation according to the response parameter when the acoustic echo impulse response is stored in the preset database.

In one implementation, the device further includes an acquiring module (not illustrated in the figures) and a judging module (not illustrated in the figures).

The acquiring module is configured to acquire feature information of the vibration signal.

The judging module is configured to determine whether the vibration signal is generated by the input operation of the user according to the feature information.

The determining module 910 is configured to determine the acoustic echo impulse response at the position of the user's ear canal where the earphone currently stays according to the audio signal and the vibration signal when the vibration signal is generated by the input operation of the user.

According to the device for processing audio signal in the implementation of the disclosure, a wrong operation triggered by any input operation can be avoided, and an action for acquiring a current acoustic echo impulse response can be triggered accurately.

In one implementation, the processing module 930 includes a third acquiring unit (not illustrated in the figures), a second determining unit (not illustrated in the figures), and a controlling unit (not illustrated in the figures).

The third acquiring unit is configured to acquire an application type of the preset application.

The second determining unit is configured to determine a directive instruction identifiable for the preset application according to the application type and the response parameter.

The controlling unit is configured to control the electronic device to execute the corresponding operation for the preset application according to the identifiable directive instruction.

According to the device for processing audio signal in the above-described implementations, preset applications of different types can be controlled correspondingly according to the application types of the preset applications, thereby achieving diversified control and improving user experience.

In one implementation, the corresponding operation executed for the preset application according to the directive instruction includes any one of: opening the preset application, closing the preset application, pausing a multimedia file currently played, adjusting volume of the multimedia file currently played, switching the multimedia file currently played, bookmarking the multimedia file currently played, downloading the multimedia file currently played, and ending a call or a recording.

The division of each module in the above-mentioned device for processing audio signal is just for illustrative purposes. In other implementations, the device for processing audio signal may be divided into different modules as needed to complete all or part of the functions of the above-mentioned device for processing audio signal.

For the definition of the device for processing audio signal, reference may be made to the definition of the method for processing audio signal, and details are not described herein again. Each of the above-mentioned modules of the device for processing audio signal can be implemented in whole or in part by software, hardware, and combinations thereof. Each of the above modules may be embedded in or independent of the processor of a computer device, or may be stored in a memory of the computer device in a software form, so that the processor can invoke and execute the operations corresponding to the above modules.

The implementation of each module of the device for processing audio signal provided in the implementations of the present disclosure may be in the form of a computer program. The computer program can run on an electronic device or a server. The program modules of the computer program can be stored in the memory of the electronic device or server. When the computer program is executed by the processor, the operations of the method described in the implementations of the present disclosure are executed.

Implementations of the disclosure further provide an earphone. The earphone includes the device for processing audio signal in the foregoing implementations. With regard to the explanation of the device for processing audio signal, reference can be made in the description of the above method for processing audio signal. The disclosure will not be repeated herein.

Implementations of the disclosure further provide a computer readable storage medium. One or more non-transitory computer readable storage media contain one or more computer executable instructions which, when executed by one or more processors, enable the processor to perform the operations of the method for processing audio signal.

Implementations of the disclosure further provide a computer program product. The computer program product contains instructions which, when executed by the computer, enable the computer to perform the method for processing audio signal.

Figure 10:
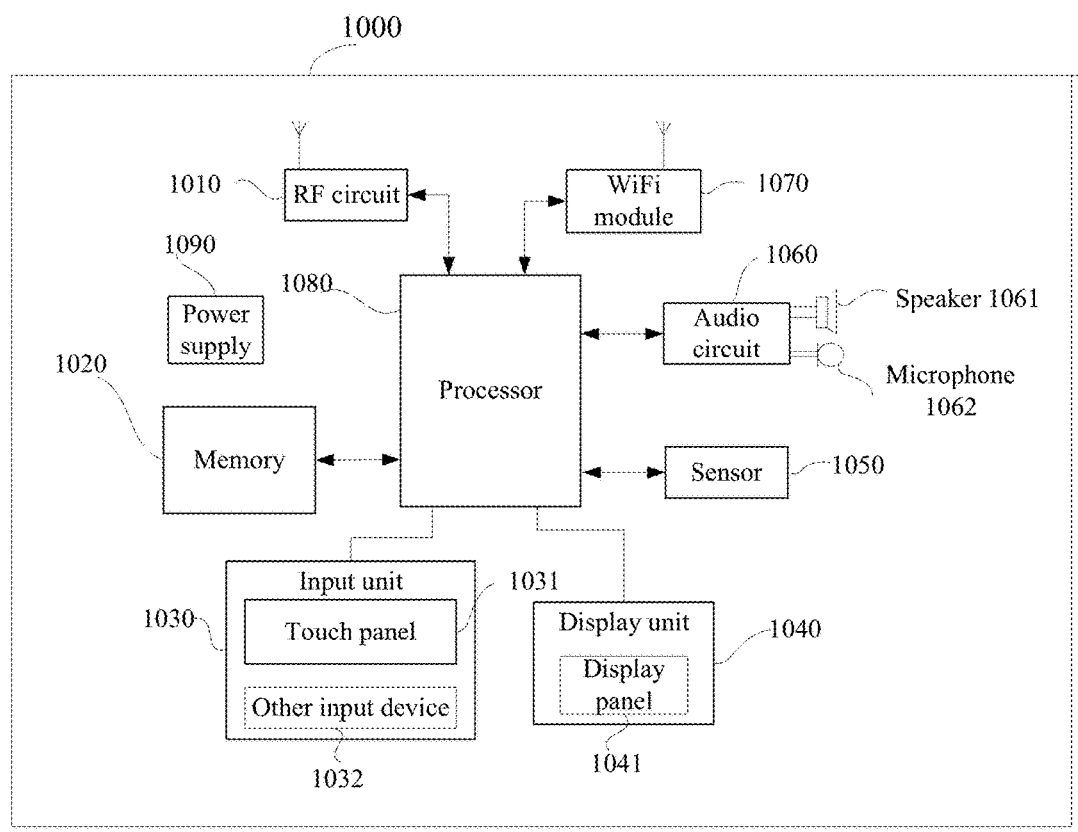
FIG. 10 is a block diagram illustrating part of a structure of a mobile phone related to an electronic device provided by an implementation of the disclosure.

Implementations of the disclosure further provide an electronic device. As illustrated in FIG. 10, just parts related to the implementations of the present disclosure are illustrated for convenience of description. For technical details not described, reference may be made to the method implementations of the present disclosure. The electronic device may be any electronic device such as a mobile phone, a tablet PC, a PDA, a point of sale electronic device (POS), an on-board computer, a wearable device, and the like. The following will describe the mobile phone as an example of the electronic device.

FIG. 10 is a block diagram of part of a structure of a mobile phone related to an electronic device provided by an implementation of the present disclosure. As illustrated in FIG. 10, the mobile phone 1000 includes radio frequency (RF) circuit 1010, a memory 1020, an input unit 1030, a display unit 1040, a sensor 1050, an audio circuit 1060, a wireless fidelity (Wi-Fi) module 1070, a processor 1080, a power supply 1090, and other components. Those skilled in the art can understand that the structure of the mobile phone illustrated in FIG. 10 does not constitute any limitation on a mobile phone. The mobile phone configured to implement technical solutions of the disclosure may include more or fewer components than illustrated, combine certain components, or have different component configuration.

The RF circuit 1010 is configured to receive or transmit information, or receive or transmit signal during a call. The RF circuit 1010 is configured to receive downlink information of a base station and transmit the downlink information to the processor 1080 to be processed. In addition, the RF circuit 1010 is configured to transmit uplink data to the base station. Generally, the RF circuit 1010 includes but not limited to an antenna, at least one amplifier, a transceiver, a coupler, a low noise amplifier (LNA), a duplexer and the like. In addition, the RF circuit 1010 may also communicate with a network and other devices via wireless communication. The above wireless communication may use any communication standard or protocol, which includes but not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 1020 is configured to store software programs and modules. The processor 1080 is configured to execute various function applications and data processing of the mobile phone by running the software programs and the modules stored in the memory 1020. The memory 1020 can mainly include a program storage area and a data storage area. The program storage area may store an operating system, applications required for at least one function (such as sound playback function, image playback function, etc.). The data storage area may store data (such as audio data, a phone book, etc.) created according to use of the mobile phone, and so on. In addition, the memory 1020 can include a high-speed RAM, and may further include a non-transitory memory such as at least one disk storage device, a flash device, or other non-transitory solid storage devices.

The input unit 1030 may be configured to receive input digital or character information and generate key signal input associated with user setting and function control of the mobile phone 100. In one implementation, the input unit 1030 can include a touch panel 1031 and other input devices 1032. The touch panel 1031 can be known as a touch screen, collect touch operations generated by the user touching the touch panel 1031 or areas near the touch panel 1031 (such as operations generated by the user using any suitable object or accessory such as a finger or a stylus to touch the touch panel 1031 or areas near the touch panel 1031), and drive a corresponding connection device according to a preset program. In one implementation, the touch panel 1031 can include two parts of a touch detection device and a touch controller. The touch detection device is configured to detect the user's touch orientation and a signal brought by the touch operation, and transmit the signal to the touch controller. The touch controller is configured to receive the touch information from the touch detection device, convert the touch information into contact coordinates, and further transmit the contact coordinates to the processor 1080. The touch controller can also receive and execute commands from the processor 1080. In addition, the touch panel 1031 may be implemented in various types such as resistive, capacitive, infrared, surface acoustic waves, etc. In addition to the touch panel 1031, the input unit 1030 may further include other input devices 1032. The input devices 1032 include but not limited to one or more of a physical keyboard, function keys (such as volume control buttons, switch buttons, etc.).

The display unit 1040 can be configured to display information input by the user, information provided for the user, or various menus of the mobile phone. The display unit 1040 may include a display panel 1041. In one implementation, the display panel 1041 may be in the form of a liquid crystal display (LCD), an organic light-emitting diode (OLED) and so on. In one implementation, the touch panel 931 may cover the display panel 1041. After the touch panel 1031 detects a touch operation on or near the touch panel 1031, the touch panel 1031 transmits the touch operation to the processor 1080 to determine a type of the touch event, and then the processor 1080 provides a corresponding visual output on the display panel 1041 according to the type of the touch event. Although in FIG. 10, the touch panel 1031 and the display panel 1041 function as two independent components to implement the input and output functions of the mobile phone. In some implementations, the touch panel 1031 and the display panel 1041 may be integrated to achieve the input and output functions of the mobile phone.

The mobile phone 1000 further includes at least one type of sensor 1050, such as a light sensor, a motion sensor, and other sensors. In one implementation, the light sensor may include an ambient light sensor and a proximity sensor, where the ambient light sensor can adjust the brightness of the display panel 1041 according to ambient lights, and the proximity sensor can turn off the display panel 1041 and/or backlight when the mobile phone reaches nearby the ear. As a kind of motion sensor, a accelerometer sensor can detect the magnitude of acceleration in all directions and when the mobile phone is stationary, the accelerometer sensor can detect the magnitude and direction of gravity; the accelerometer sensor can also be configured for applications related to identification of mobile-phone gestures (such as vertical and horizontal screen switch), vibration-recognition related functions (such as a pedometer, percussion), and so on. The mobile phone can also be equipped with a gyroscope, a barometer, a hygrometer, a thermometer, an infrared sensor, and other sensors.

The audio circuit 1060, a speaker 1061, and a microphone 1062 may provide an audio interface between the user and the mobile phone. The audio circuit 1060 may convert the received audio data into electrical signals and transfer the electrical signals to the speaker 1061; thereafter the speaker 1061 converts the electrical signals into sound signals to output. On the other hand, the microphone 1062 converts the received sound signals into electrical signals, which will be received and converted into audio data by the audio circuit 1060 to output. The audio data is then processed by the processor 1080 and transmitted via an RF circuit 1010 to another mobile phone. Alternatively, the audio data is output to the memory 1020 for further processing.

Wi-Fi belongs to a short-range wireless transmission technology. With aid of the Wi-Fi module 1070, the mobile phone can assist the user in receiving and sending an E-mail, browsing through webpage, accessing streaming media, and the like. Wi-Fi provides users with wireless broadband Internet access. Although the Wi-Fi module 1070 is illustrated in FIG. 10, it is to be understood that the Wi-Fi module 1070 is not necessary to the mobile phone 1000 and can be omitted according to actual needs.

The processor 1080 is a control center of the mobile phone. The processor 1080 connects various parts of the entire mobile phone through various interfaces and lines. By running or executing software programs and/or modules stored in the memory 1020 and calling data stored in the memory 1020, the processor 1080 can execute various functions of the mobile phone and conduct data processing, so as to monitor the mobile phone as a whole. The processor 1080 can include one or more processing units. In an implementation, the processor 1080 can integrate an application processor and a modem processor, where the application processor is mainly configured to handle an operating system, a user interface, applications, and so on, and the modem processor is mainly configured to deal with wireless communication. It is to be understood that the modem processor mentioned above may not be integrated into the processor 1080. For example, the processor 1080 can integrate an application processor and a baseband processor, and the baseband processor and other peripheral chips can form a modem processor. The mobile phone 1000 further includes a power supply 1090 (such as a battery) that supplies power to various components. For instance, the power supply 1090 may be logically coupled to the processor 1080 via a power management system to enable management of charging, discharging, and power consumption through the power management system.

In one implementation, the mobile phone 1000 may further include a camera, a Bluetooth® module, and so on.

In the implementation of the present disclosure, the processor 1080 included in the mobile phone implements the method for processing audio signal described above when executing the computer programs stored in the memory.

Implementations of the disclosure further provide an earphone, which includes an electroacoustic transducer, a memory, a processor, and computer programs that are stored in the memory and can be run by the processor. The processor is electrically coupled with the electroacoustic transducer and the memory, and the processor invokes the computer programs to perform the method for processing audio signal.

In one implementation, the electroacoustic transducer is configured to play an audio signal and further configured to record an acoustic echo signal generated by reflection and vibration of the audio signal and a vibration signal through the ear canal.

In one implementation, the electroacoustic transducer includes a speaker and a microphone. The speaker is configured to play the audio signal, and the microphone is configured to record the acoustic echo signal generated by reflection and vibration of the audio signal and vibration signal through the ear canal.

In one implementation, the speaker is integrated with the microphone.

Any reference to a memory, storage, database, or other medium used herein may include a non-transitory and/or transitory memory. Suitable non-transitory memories may include a ROM, a programmable ROM (PROM), an electrically programmable ROM (EPROM), an electrically erasable programmable ROM (EEPROM), or a flash memory. The transitory memory may include a RAM, which acts as an external cache. For illustration rather than limitation, the RAM is available in a variety of forms, such as a static RAM (SRAM), a dynamic RAM (DRAM), a synchronous DRAM (SDRAM), a double data rate SDRAM (DDR SDRAM), an enhanced SDRAM (ESDRAM), a synchronization link DRAM (SLDRAM), a Rambus direct RAM (RDRAM), a direct Rambus dynamic RAM (DRDRAM), and a Rambus dynamic RAM (RDRAM).

The above implementations are merely illustrative of several implementations of the present disclosure. The description thereof is specific and detailed, but not to be construed as limiting the scope of the claims. It should be noted that, various variations and modifications may be made by those skilled in the art without departing from the spirit and scope of the present disclosure. Therefore, the scope of the present disclosure should be determined by the appended claims.

What is claimed is:

1. A method for processing audio signal, comprising:
   receiving an input operation of a user performed on an earphone;
   determining an acoustic echo impulse response at a position of the user's ear canal where the earphone currently stays according to an audio signal currently played by the earphone and a vibration signal generated by the input operation;
   identifying a directive instruction corresponding to the input operation at least according to the acoustic echo impulse response;
   controlling an electronic device in communication with the earphone to execute a corresponding operation for a preset application in the electronic device according to the directive instruction, the preset application being an application corresponding to the audio signal currently played by the earphone; and
   wherein identifying the directive instruction corresponding to the input operation at least according to the acoustic echo impulse response comprises:
   acquiring, in a preset time period, a response parameter of the acoustic echo impulse response, wherein the response parameter at least contains a response position and response times; and
   identifying the directive instruction corresponding to the input operation according to the response parameter.

2. The method of claim 1, wherein determining the acoustic echo impulse response at the position of the user's ear canal where the earphone currently stays according to the audio signal currently played by the earphone and the vibration signal generated by the input operation comprises:
   acquiring the audio signal currently played by the earphone and the vibration signal;
   recording an acoustic echo signal generated by reflection and vibration of the audio signal and the vibration signal through the ear canal; and
   determining the acoustic echo impulse response at the position of the user's ear canal where the earphone currently stays according to the acoustic echo signal.

3. The method of claim 1, wherein receiving the input operation on the earphone comprises:
   acquiring feature information of the vibration signal; and
   determining whether the vibration signal is generated by the input operation according to the feature information; and
   determining the acoustic echo impulse response at the position of the user's ear canal where the earphone currently stays according to the audio signal and the vibration signal comprises:
   determining the acoustic echo impulse response at the position of the user's ear canal where the earphone currently stays according to the audio signal and the vibration signal based on a determination that the vibration signal is generated by the input operation.

4. The method of claim 1, wherein the corresponding operation executed for the preset application according to the directive instruction comprises one of:
   opening the preset application, closing the preset application, pausing a multimedia file currently played, adjusting volume of the multimedia file currently played, switching the multimedia file currently played, bookmarking the multimedia file currently played, downloading the multimedia file currently played, and ending a call or a recording.

5. An earphone, comprising:
   at least one processor; and
   a computer readable memory, coupled with the at least one processor and storing at least one computer executable instruction therein which, when executed by the at least one processor, causes the at least one processor to carry out actions, comprising:
   receiving an input operation of a user performed on the earphone;
   determining an acoustic echo impulse response at a position of the user's ear canal where the earphone currently stays according to an audio signal currently played by the earphone and a vibration signal generated by the input operation;
   identifying a directive instruction corresponding to the input operation at least according to the acoustic echo impulse response;
   controlling an electronic device in communication with the earphone to execute a corresponding operation for a preset application in the electronic device according to the directive instruction, the preset application being an application corresponding to the audio signal currently played by the earphone; and wherein the at least one processor carrying out the action of identifying the directive instruction corresponding to the input operation at least according to the acoustic echo impulse response is caused to carry out actions, comprising:

acquiring, in a preset time period, a response parameter of the acoustic echo impulse response, wherein the response parameter at least contains a response position and response times; and identifying the directive instruction corresponding to the input operation according to the response parameter.

6. The earphone of claim 5, wherein the at least one processor carrying out the action of determining the acoustic echo impulse response at the position of the user's ear canal where the earphone currently stays according to the audio signal currently played by the earphone and the vibration signal generated by the input operation is caused to carry out actions, comprising:

acquiring the audio signal currently played by the earphone and the vibration signal;

recording an acoustic echo signal generated by reflection and vibration of the audio signal and the vibration signal through the ear canal; and determining the acoustic echo impulse response at the position of the user's ear canal where the earphone currently stays according to the acoustic echo signal.

7. The earphone of claim 5, wherein the at least one processor carrying out the action of receiving the input operation on the earphone is caused to carry out actions, comprising:

acquiring feature information of the vibration signal; and determining whether the vibration signal is generated by the input operation according to the feature information; and the at least one processor carrying out the action of determining the acoustic echo impulse response at the position of the user's ear canal where the earphone currently stays according to the audio signal and the vibration signal is caused to carry out an action, comprising:

determining the acoustic echo impulse response at the position of the user's ear canal where the earphone currently stays according to the audio signal and the vibration signal when the vibration signal is generated by the input operation of the user.

8. The earphone of claim 5, wherein the corresponding operation executed for the preset application according to the directive instruction comprises one of:

opening the preset application, closing the preset application, pausing a multimedia file currently played, adjusting volume of the multimedia file currently played, switching the multimedia file currently played, bookmarking the multimedia file currently played, downloading the multimedia file currently played, and ending a call or a recording.

9. An electronic device, comprising:

at least one processor; and a computer readable memory, coupled with the at least one processor and storing at least one computer executable instruction therein which, when executed by the at least one processor, causes the at least one processor to carry out actions, comprising:

receiving an input operation of a user performed on an earphone in communication with the electronic device;

determining an acoustic echo impulse response at a position of the user's ear canal where the earphone currently stays according to an audio signal currently played by the earphone and a vibration signal generated by the input operation;

identifying a directive instruction corresponding to the input operation at least according to the acoustic echo impulse response;

executing a corresponding operation for a preset application in the electronic device according to the directive instruction, the preset application being an application corresponding to the audio signal currently played by the earphone; and wherein the at least one processor carrying out the action of identifying the directive instruction corresponding to the input operation at least according to the acoustic echo impulse response is caused to carry out actions, comprising:

acquiring, in a preset time period, a response parameter of the acoustic echo impulse response, wherein the response parameter at least contains a response position and response times;

acquiring an application type of the preset application; and identifying the directive instruction corresponding to the input operation according to the response parameter and the application type of the preset application.

10. The electronic device of claim 9, wherein the at least one processor carrying out the action of determining the acoustic echo impulse response at the position of the user's ear canal where the earphone currently stays according to the audio signal currently played by the earphone and the vibration signal generated by the input operation is caused to carry out actions, comprising:

acquiring the audio signal currently played by the earphone and the vibration signal;

recording an acoustic echo signal generated by reflection and vibration of the audio signal and the vibration signal through the ear canal; and determining the acoustic echo impulse response at the position of the user's ear canal where the earphone currently stays according to the acoustic echo signal.

11. The electronic device of claim 9, wherein the at least one processor carrying out the action of receiving the input operation on the earphone is caused to carry out actions, comprising:

acquiring feature information of the vibration signal; and determining whether the vibration signal is generated by the input operation according to the feature information; and the at least one processor carrying out the action of determining the acoustic echo impulse response at the position of the user's ear canal where the earphone currently stays according to the audio signal and the vibration signal is caused to carry out an action, comprising:

determining the acoustic echo impulse response at the position of the user's ear canal where the earphone currently stays according to the audio signal and the vibration signal when the vibration signal is generated by the input operation.

* * * * *